United States Patent Office 3,826,737
Patented July 30, 1974

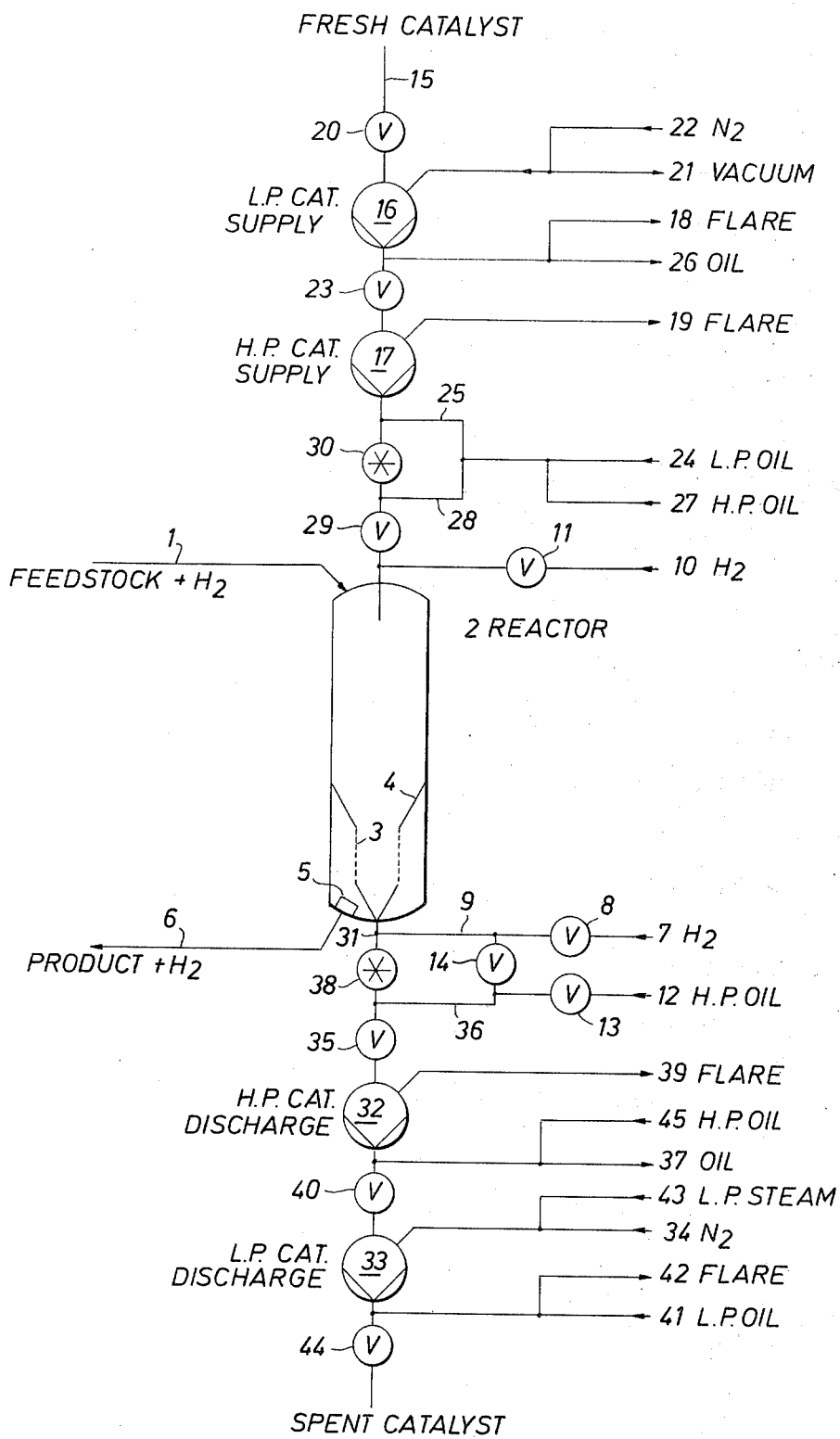

3,826,737
PROCESS FOR THE CATALYTIC TREATMENT
OF HYDROCARBON OILS
Abraham A. Pegels, The Hague, and Joannes B. Wijffels,
Amsterdam, Netherlands, assignors to Shell Oil Company, New York, N.Y.
Filed Feb. 6, 1973, Ser. No. 330,142
Claims priority, application Great Britain, Feb. 21, 1972,
7,948/72
Int. Cl. C10g 23/08
U.S. Cl. 208—143                                   10 Claims

ABSTRACT OF THE DISCLOSURE

A continuous process and apparatus for the catalytic treatment of hydrocarbon oils wherein an oil is passed over a catalyst bed within a reactor, the bottom of which contains a catalyst discharge funnel incorporating a screen for separating catalyst and oil at a point above the exit of the funnel, fresh catalyst being introduced at the top of the catalyst bed and spent catalyst being withdrawn at the bottom thereof while the process is operating. The catalyst discharge funnel preferably consists of at least two inverted conical sections connected by means of a cylindrical screen section.

BACKGROUND OF THE INVENTION

The present invention relates to a continuous process and an apparatus for the catalytic treatment of hydrocarbon oils.

In processes for the catalytic treatment of hydrocarbon oils the activity of the catalysts used decreases with continued use. The rate of such decrease in activity depends on the nature of the catalyst, the nature of the hydrocarbon feedstock and the process conditions. Accordingly the rate may be slow and the reduction of the activity of the catalyst bed to unacceptable economic levels may take one or two years or it may be fast and such levels may be reached in a number of hours. Between these two extremes a whole range of deactivation rate exists.

In catalytic processes where the rate of decrease of catalyst activity is high, frequent regeneration of the catalyst becomes necessary such that the regeneration time becomes a substantial proportion of the onstream time. The consequent loss in production cannot generally be accepted and therefore swing-reactor systems have been developed to enable production to continue in one or more reactors while one or more others are being regenerated. These systems however give rise to relatively large and complicated plants and are therefore expensive. It is therefore an object of this invention to provide a continuous process for the catalytic treatment of hydrocarbon oils which is carried out in one or more reactors to which fresh catalyst is added and spent catalyst is withdrawn during operation. In this way it is possible to maintain a continuous catalytic process having a substantially constant catalyst activity.

At the temperatures and pressures at which such catalytic processes operate problems arise with regard to the discharge of catalyst from the reactor during operation and with regard to the separation of catalyst from liquid and gaseous hydrocarbon oils and the introduction and withdrawal of the latter from the reactor. It is therefore another object of this invention to provide a process in which these operations may be carried out without difficulty.

SUMMARY OF THE INVENTION

The present invention therefore relates to a continuous process for the catalytic treatment of hydrocarbon oils which process comprises passing an oil over a catalyst bed within a reactor, the bottom of which contains a catalyst discharge funnel incorporating a screen at a point above the exit of the funnel, fresh catalyst being introduced at the top of the catalyst bed and spent catalyst being withdrawn at the bottom thereof.

The process according to the present invention may be used for operation in the gaseous phase or for operation in the liquid phase or for operation partly in the gaseous phase and partly in the liquid phase. The oil feed is either introduced at the top of the reactor and passes in downflow over the catalyst bed or it introduced at the bottom of the reactor and passes in upflow over the catalyst bed. In the former case the oil passes through the reactor in cocurrent flow with the catalyst and the product is separated from the catalyst and withdrawn from the reactor via the screen and in the latter the oil is introduced to the catalyst bed via the screen, passes in countercurrent flow to the catalyst and the product is withdrawn at the top of the reactor. Which of the two modes of operation is employed depends on the nature of the particular catalytic process concerned.

The present process may be employed for a great variety of continuous catalytic treatments of hydrocarbon oils. Examples of such treatments are catalytic cracking, reforming, polymerization, alkylation and isomerization. It is particularly suitable for the catalytic hydrotreatment of hydrocarbon oils in which the oil is passed together with a hydrogen-containing gas over the catalyst bed. Such hydrotreatments include, without limitation, hydrogenation, hydrocracking, hydrodesulphurization and/or hydrodenitrification.

The catalytic hydrotreatment of hydrocarbon oils which are at least in part in the liquid phase is advantageously carried out according to the present process. Accordingly the oil feedstock may comprise high boiling hydrocarbon oils such as distillate or residual oils obtained from the atmospheric or vacuum distillation of crude petroleum. Heavy oils obtained by catalytic or thermal cracking of petroleum fractions are also highly suitable feedstocks for the hydro-processes carried out in accordance with this invention.

In a particular embodiment the present invention may be advantageously employed for removal of metal contaminants from and the hydrodesulphurization of a residual oil.

As is known, residual oils contain various metal-containing and metal-free components of high molecular weight which have a deleterious effect upon the catalyst activity of the hydrodesulphurization process to which the residual oil is subjected. The most important metal-containing components are compounds containing nickel and vanadium and of the metal-free components resins, polyaromatics and asphaltenes are of importance. The deposition of the heavy metal compounds and the coke formation caused in particular by the asphaltenes severely reduces the capability of the catalyst to convert the sulphur-containing compounds in the residual oil. In fixed bed hydrodesulphurization of residual oils the catalyst contamination by metals requires that the process must be periodically interrupted so that the catalyst may be replaced. These periodic interruptions may become frequent in the case of heavily contaminated residual oils and result in very inefficient operation.

The application of the present process as a preliminary step in a process for the hydrodesulphurization of residual oils very conveniently provides a method for continuous and efficient operation. In such a process the residual oil feed is advantageously firstly fed to one or more reactors operating the process according to the invention wherein the metal contaminants in the oil are substantially reduced and the sulphur content of the oil is preferably decreased. Then the substantially demetalized oil is fed to one or more fixed bed hydrodesulphurization reactors in which the oil is hydrodesulphurized. The reactor(s) operating the present process therefore act(s) as (a) guard reactor(s) for the fixed bed reactor(s) by removing the majority of the metal contaminants which would otherwise poison the catalyst in the latter. The present process is able to provide a continuous supply of residual oil, de-metalized to a substantially constant degree, to the fixed bed reactors which are therefore able to operate for far longer periods of time without regeneration and/or catalyst replacement than would otherwise be possible. Moreover, since the catalyst in the guard reactor(s) is continuously or periodically removed and replaced by fresh catalyst the possibility of the plugging of the catalyst bed in the guard reactor(s) is precluded. The same holds true for the following fixed bed hydrodesulphurization reactor(s) since it (they) is (are) operated on a substantially de-metallized feedstock.

The supply and withdrawal of catalyst is usually effected periodically but may in some cases be continuous.

In the former case the supply of fresh catalyst may be effected at the same time as the withdrawal of spent catalyst. In practice this is not so convenient, however, and it is preferred to first withdraw an amount of spent catalyst and then immediately afterwards to supply an equal amount of fresh catalyst. This sequence of withdrawal followed by supply may be reversed if desired. In each withdrawal/supply period betwen 0.1% and 100% of the total catalyst inventory may be withdrawn/supplied. Preferably the withdrawal/supply range is restricted to between 0.5% and 20% of the total catalyst inventory. The duration of each withdrawal period preferably varies from 0.5 to 30 minutes and the number of withdrawal periods per week preferably varies from 1 to 200.

In the case of continuous catalyst supply with withdrawal, which may for instance be desirable when the rate of catalyst deactivation is high thus requiring a correspondingly high rate of catalyst replenishment, between 0.1% and 100% of the total catalyst inventory is suitably withdrawn per hour while fresh catalyst is added at the same rate. Preferably between 0.5% and 20% of the total catalyst inventory is, however, withdrawn and supplied to the reactor per hour.

The dimensions of the catalyst particles used in the present process may vary widely and the catalyst particle diameters may lie in the range of 0.1 to 10 millimetres. However, in order to obtain a good contact between the active places on and within the catalyst particles and the liquid and/or gas the catalyst particles preferably possess relatively small diameters. Accordingly catalyst particles having diameters in the range of 0.1 to 5 millimeters are preferred.

As mentioned hereinbefore the present process is very suitable for the catalytic hydrotreatment of hydrocarbon oils. The catalyst which may be advantageously employed for such hydrotreatments preferably contains one or more metals of Group VI B (chromium, molybdenum, tungsten) and/or the Iron Group (iron, nickel, cobalt) of the Periodic Table of Elements and/or one or more oxides and/or sulphides of such metal(s) deposited on a refractory oxidic carrier. Examples of such a carrier are alumina, silica, magnesia, titania and mixtures thereof.

The reaction conditions used for the hydrotreatments according to a preferred embodiment of this invention may vary within wide limits and primarily depend on the nature of the hydrocarbon oil feedstock used. The temperature may vary between 300° C. and 475° C. and the total pressure from 20 to 350 kg./cm.$^2$. The weight hourly space velocity may vary between 0.1 and 10 parts by weight of fresh oil feed per part by volume of catalyst per hour.

The catalyst discharge funnel which is incorporated in the bottom of the reactor may comprise any funnel system which facilitates mass-flow of catalyst down the reactor at such times as spent catalyst is being withdrawn from the bottom of the reactor. By mass-flow is meant that the catalyst particles move down at about equal rates in the cylindrical part of the reactor at whatever points in this part of the reactor the particles are situated. This means that all catalyst particles have the same residence time within the reactor and that therefore the spent catalyst particles withdrawn at the bottom will be deactivated to substantially the same degree. Without the use of such a discharge funnel the catalyst particles descend the reactor in funnel flow in which the particles at the centre of the reactor descend faster than those at the sides of the reactor, part of the catalyst inventory situated near the wall of the reactor possibly being even stagnant. As a consequence a substantial proportion of relatively active catalyst is withdrawn at each withdrawal period which results in inefficient operation of the reactor.

However, the incorporation of such a catalyst discharge funnel creates a problem with regard to the introduction or withdrawal of gas and/or liquid from the bottom of the reactor. The presence of the funnel creates a very high pressure differential between the main section of the catalyst bed and the bottom of the funnel. In these circumstances if the introduction or withdrawal of gas and/or liquid is effected at or below the funnel exit unever pressure conditions prevail in the inlet or outlet, as the case may be, which in turn lead to liquid and/or gaseous surging effects therein. In order to overcome these undesirable effects the present process incorporates a screen in the catalyst discharge funnel at a point above the funnel exit between which point and the main catalyst bed there is a relatively low pressure differential. Accordingly liquid and/or gas may be introduced to or withdrawn from the reactor without encountering the surging effects mentioned above.

The shape of the screen(s) and the angle which the screen(s) make(s) with the horizontal plane may vary widely. For practical and economic reasons, however, the screen(s) is (are) generally flat and the angle which the screen(s) make(s) with the horizontal plane is between 45° and 180°.

In a preferred embodiment of the present invention the catalyst discharge funnel consists of at least two inverted conical sections, the bottom of an upper section being connected to the top of a lower section by means of a cylindrical screen section. The conical sections facilitate the mass-flow of catalyst down the reactor and the screen(s) act(s) to separate the catalyst bed from the liquid and/or gas inlet or outlet as the case may be. In this case the walls of the screen are parallel to the direction of catalyst flow, viz. at 90° to the horizontal plane. This arrangement is favourable because the resistance to catalyst flow is minimized. This point may be especially important where a woven screen is used which does not favour catalyst flow down the reactor because of its rough nature.

The physical characteristics of the catalyst discharge funnel used in any process carried out in accordance with the present invention should be such that smooth discharge of catalyst may be effected. In this regard the size of the catalyst particles used is of critical importance. It is essential that the physical dimensions of the funnel exit are such that for the particular size of catalyst particles used blocking of the exit by the phenomenon known in the art as bridge formation does not occur. Accordingly the shortest characteristic diameter of a particular funnel exit is preferably not smaller than 10 centimetres. A circular funnel exit having a diameter of at least 10 centimetres is preferably employed in the present invention.

When a catalyst discharge funnel comprising two or more inverted conical sections and one or more cylindrical screens section, as preferred according to the present invention, is used mass-flow of catalyst in the reactor is preferably induced by employing conical sections which make angles with the vertical axis of the reactor of between 5° and 45°. A more preferred range which includes the majority of processes operated according to the present invention is between 10° and 35°. The angles which the inverted conical sections make with the vertical axis of the reactor may be the same.

As may be expected the conditions prevailing within a reactor carrying out a catalytic process may have the effect of gradually corroding the screen. Since this corrosion may cause a failure or rupture of the screen during operation it is a preferable safeguard to incorporate a secondary screen in the bottom of the reactor. This secondary screen is especially of importance when the reactor is being operated in downflow since but for its presence a failure of the main screen during operation would entail catalyst being withdrawn from the reactor together with the product.

The mesh size of the screen(s) used varies according to the size of the catalyst particles employed in the process but is, of course, always smaller than the catalyst particle size. Accordingly mesh sizes of between 18 and 170 (British Standard Screen Series) are preferable although more preferably mesh sizes between 18 and 85 will be used.

As a consequence of introducing or withdrawing liquid and/or gas from the reactor via a screen situated at a point above the bottom of the reactor there exists in the reactor below the screen an oil and catalyst mixture which is substantially static. At the high reactor temperatures used the hydrocarbon oils in this mixture are liable to coke up and hydrocracking reactions are promoted due to the presence of spent catalyst. These hydrocracking reactions lead to undesirable phenomena such as temperature and pressure increases and the coking gives rise to the formation of large solid lumps of catalyst. In this way the catalyst exit may easily become blocked.

In order to overcome these difficulties fresh hydrogen-containing gas is advantageously introduced into the bottom of the reactor. The effect of this is twofold. Firstly the oil in the bottom of the reactor is no longer static but is blown up by the gas into the main body of the reactor. Accordingly, the oil occurring below the screen is continually being changed and the undersirable reactions are impeded. Secondly, since the temperature of the hydrogen-containing gas which is introduced is preferably below the temperature of the oil and catalyst mixture occurring at the bottom of the reactor the mixture is cooled by the gas to temperatures at which the undesirable reactions are not longer sustained. The amount of gas which is preferably introduced into the bottom of the reactor lies between 10 and 4000 normal cubic metres per ton of total oil feed and the temperature of the gas preferably lies between ambient and 350° C. although a temperature below 200° C. is more preferred.

Another method in which the above-mentioned difficulties can be overcome either as an alternative to or in conjunction with the introduction of fresh hydrogen-containing gas is to introduce cold oil into the bottom of the reactor. In some circumstances, as for instance when the hydrogen-containing gas supply is not sufficient or is cut off, the introduction of cold oil is very desirable. The amount of cold oil which is introduced into the bottom of the reactor preferably does not exceed 10% by weight of the total oil feed and the temperature of the oil is preferably between ambient and 350° C. More preferably the oil has a temperature below 200° C.

A further reason for the introduction of the hydrogen-containing gas and/or the cold oil is to reduce the temperature of the hydrocarbon oil and catalyst mixture in the bottom of the reactor to a level at which catalyst withdrawal is facilitated.

If the valves which are situated in the catalyst withdrawal conduit are operated at high reactor temperatures they are liable to corrode rapidly. However, if the temperature of the catalyst mixture being withdrawn via these values is below 350° C. these corrosion problems are substantially reduced. Accordingly the introduction of hydrogen-containing gas and/or cold oil is preferably regulated such that the temperature of the oil and catalyst mixture occurring below the level of the inlet of the hydrogen-containing gas and/or cold oil feed is below 350° C.

Discharge of spent catalyst advantageously takes place via a conduit in which the catalyst first passes a solid-handling valve and subsequently a liquid- and gas-tight high pressure valve. Any suitable solid-handling valve may be used but a rotary valve is preferred.

At the pressures at which catalytic processes operate it is essential that the liquid- and gas-tight high pressure valve be very tightly closed when catalyst is not being withdrawn from the reactor. The effectiveness of the high pressure valve can be substantially reduced if catalyst particles become crushed between the valve and its seating when the valve is closed. It is therefore very useful to provide the conduit with means for flushing the liquid- and gas-tight high-pressure valve to ensure that no catalyst particles hinder the closing of the valve. Accordingly cold flushing oil is preferably introduced between the solid-handling valve and the liquid- and gas-tight high-pressure valve for this purpose. More preferably the flushing oil used is a cold side stream of the liquid hydrocarbon oil feed, but it may also be cold product. Advantageously the amount of cold oil introduced does not exceed 10% by weight of the total oil feed and in many cases the amount will be considerably less than 10%. The temperature of the cold oil advantageously lies between ambient and 350° C. although a temperature below 200° C. is preferred.

The invention may be performed in various ways and some specific embodiments will now be further elucidated with reference to the drawing in which accessories such as valves, pumps, control instruments and the like are not all shown.

DESCRIPTION OF THE DRAWING

A method for the demetalization of residual oils as a preliminary step in a process for the hydrodesulphurization of residual oils is diagrammatically shown in the drawing.

A heated mixture of a metal-contaminated, sulphur-containing residual oil and a hydrogen-containing gas is passed through a line 1 to the top of a guard reactor 2. The mixture passes in downflow over the catalyst bed contained in the guard reactor and the demetalized oil and gas are separated from the catalyst by means of a screen 3, forming part of a discharge funnel 4, and pass out of the reactor via a secondary screen 5 through a line 6. The oil then passes via the line 6 to one or more fixed bed hydrodesulphurization reactors not shown in the drawing. High pressure hydrogen purge gas is introduced via a line 7, a valve 8 and a line 9 into the bottom of the reactor and via a line 10 and a valve 11 into the top of the reactor. High pressure flush oil is introduced into the bottom of the reactor via a line 12, valves 13 and 14 and the line 9.

The introduction of fresh catalyst to the reactor during operation is effected via a line 15 by means of a low pressure catalyst supply vessel 16 and a high pressure catalyst supply vessel 17.

The vessels 16 and 17 and catalyst discharge vessels 32 and 33, to be discussed below, may be provided with inverted cones as discharge funnels.

At the start of the operation the vessel 16 is lined up with a flare system not shown in the drawing via a line 18, the pressure therein being approximately atmospheric and the temperature ambient; the vessel 17 is completely isolated and full of liquid at increased temperature and high pressure.

In order to introduce fresh catalyst to the reactor, the vessel 17 is firstly depressurized by lining it up with the flare system via a line 19. The vessel 16 is then isolated from the flare system. Fresh catalyst is then loaded into the vessel 16 via a valve 20 after which it is again isolated and any oxygen which may have entered the vessel is evacuated via a line 21. The vacuum is broken by lining the vessel 16 up to the flare and the vessel 16 is finally purged with nitrogen via a line 22. The vessel 17 is then isolated from the flare, a butterfly valve 23 is opened and the catalyst passes into the vessel 17. Low pressure flush oil is then admitted to the bottom of the vessel 17 via a line 24 and passes via a line 25, the vessel 17 and the valve 23 out through a line 26. This accomplishes the flushing of the valve 23 of catalyst particles in order that it provides an effective seal. The valve 23 is then closed and the low pressure flush oil shut off.

Catalyst is then introduced to the reactor by firstly connecting the vessel 17 to the high pressure flush oil supply system via a line 27 and the lines 25 and 28 in order to obtain approximately equal pressure conditions in the reactor and the vessel 17. A butterfly valve 29 is then opened and a rotary valve 30 is turned a number of revolutions in order to supply the required amount of catalyst to the reactor. The valve 29 is closed after a sufficient time is allowed for its seating to be flushed and the high pressure flush oil supply is shut off.

Withdrawal of spent catalyst from the reactor is effected via a line 31 by means of a high pressure catalyst discharge vessel 32 and a low pressure catalyst discharge vessel 33.

At the start of the operation the vessel 32 is completely isolated and full of liquid at increased temperature and high pressure. The vessel 33 is lined up to the flare via a line 42, the pressure therein being approximately atmospheric and the temperature being below 250° C.

In order to withdraw spent catalyst from the reactor, the vessel 32 is connected with the reactor bottom by opening a butterfly valve 35. High pressure flush oil is then passed via a line 12, a valve 13, a line 36 and a valve 35 through the vessel 32 and is withdrawn from the system via a line 37. The required amount of spent catalyst is withdrawn from the reactor by turning a rotary valve 38 a number of times. The high pressure flush oil is then closed after a sufficient time is allowed for flushing the seating of the valve 35, which is then closed.

Spent catalyst is then removed from the vessel 32 into the vessel 33 by firstly depressurizing the vessel 32 by lining it up with the flare system via a line 39. Then the vessel 33 is isolated from the flare system and connected to the vessel 32 by opening a butterfly valve 40. Low pressure flush oil is then passed into the bottom of the vessel 33 via a line 41 and flows via the vessel 33, the valve 40 and the vessel 32 to the flare system via the line 39. Under the influence of gravity all the catalyst passes into the vessel 33. The seating of the valve 40 is flushed and the vessel 32 is liquid full at the end of the operation. The valve 40 is then closed and the low pressure flush oil supply is shut off. In order to displace the liquid from the vessel 33 it is lined up to the flare system via a line 42 and nitrogen is introduced into the top of the vessel 33 via a line 34. When the liquid is blown out, low pressure steam is introduced to the vessel 33 via a line 43 and a ball valve 44 is opened. The catalyst is then discharged via a valve 44 into a water-filled open container (not shown). When the vessel 33 has been unloaded the valve 44 is closed and the steam supply is shut off. A high pressure supply line 45 is then connected to the vessel 32, to bring the pressure in the vessel 32 up to reactor pressure and is then shut off.

The following Example will further elucidate the invention.

Example

A residual oil, obtained in the atmospheric distillation of a crude petroleum had the following properties:

Initial boiling point: 274° C.
Viscosity at 210° F.: 26.1 cs.
Specific gravity 7°/4° C.: 918 kg./m.$^3$
Sulphur content: 3.91% by weight.
Vanadium content: 49 p.p.m. by weight.
Nickel content: 13.4 p.p.m. by weight.
$C_5$-asphaltenes: 6.1% by weight.

This residue was used as starting material for the hydrodesulphurization process described hereinbefore with the aid of the drawing.

The fresh catalyst supplied to the reactor contained 2% wt. Ni and 16% wt. Mo on an alumina carrier. The properties of this catalyst were:

Average particle size: 0.8 mm.
Bulk density: 470 kg./m.$^3$

The weight of catalyst contained in the reactor was 21.2 tons and the percentage of the total catalyst inventory which was withdrawn at each withdrawal period was 2.22%, an equal amount of fresh catalyst being supplied.

The number of withdrawal periods per day was 1 and each period lasted 10 minutes.

The nickel content of the spent catalyst was 8% by weight and the vanadium content of the spent catalyst was 29% by weight.

The catalyst discharge funnel consisted of two inverted conical sections, the bottom of the larger section being connected to the top of the smaller section by a cylindrical screen of diameter 235 centimetres. The mesh size of the screen was 15, the wire diameter being 0.4 mm. The diameter of the circular funnel exit was 18 centimetres and the angle which both the conical sections made with the vertical axis of the reactor was 45°. The heights of the screen, of the upper conical section and of the lower conical section were 20, 50 and 110 centimetres respectively. The diameter of the top of the larger cone was the same as the inner diameter of the reactor which was 330 centimetres.

The reactor conditions were:

Average temperature: 420° C.
Average pressure: 130 kg./cm.$^2$ gauge.
Average space velocity: 4 m.$^3$ of oil/hr./m.$^3$ of catalyst.
Average linear velocity of the oil: 0.01 m./sec.

The amount of oil feed fed to the reactor per hour was 167 tons 500 Nm.$^3$ of hydrogen rich gas per ton of oil feed were introduced with the oil feed.

75 Nm.$^3$/hr. of hydrogen rich gas and 2 Nm.$^3$/hr. of cold oil feed were introduced into the bottom of the reactor. The temperature of the hydrogen rich gas was 60° C. and of the cold oil feed 150° C. The hydrogen-rich gas contained 86% by weight of hydrogen, the remainder being low boiling hydrocarbons.

The metal content of the oil stream leaving the reactor was 17.6 p.p.m. by weight vanadium and 1.2 p.p.m. by weight nickel giving a demetallization percentage of 70%. The sulphur content of the oil stream leaving the reactor was 3.71% by weight giving a desulphurization percentage of 5%. The process provided a continuous oil stream having the above percentages of metal contaminants and sulphur.

What is claimed is:

1. In a continuous process for the catalytic treatment under hydrotreating conditions of hydrocarbon oils which includes passing a substantially liquid phase oil and hydrogen in downflow over a catalyst bed within a reactor, introducing fresh catalyst at the top of said catalyst bed and withdrawing spent catalyst from the bottom thereof while operating said process, the improvement which comprises:
    passing said oil and spent catalyst into a catalyst discharge funnel having an exit located at the bottom of said reactor; separating said oil and spent catalyst with a screen incorporated in said funnel at a point above the exit, where there is a relatively low pressure differential, before withdrawing said spent catalyst from said reactor; withdrawing treated product from said reactor via said screen; and adding a cold fluid to the bottom of said reactor to prevent coking in the catalyst-oil mixture located below said separating screen.

2. The process of claim 1 wherein said oil is a residual oil and said treatment includes hydrodesulphurization, metal contaminants being simultaneously removed from said oil.

3. The process of claim 1 wherein spent catalyst is withdrawn periodically from said reactor and fresh catalyst is supplied periodically to said reactor.

4. The process of claim 1 wherein spent catalyst is withdrawn continuously from said reactor and fresh catalyst is supplied continuously to said reactor.

5. The process of claim 1 wherein said catalyst discharge funnel consists of at least two inverted conical sections, the bottom of an upper section being connected to the top of a lower section by means of a cylindrical screen section, and wherein the exit of said funnel is at least 10 centimeters in diameter.

6. The process of claim 5 wherein the angles between said inverted conical sections and the vertical axis of the reactor are between 5° and 45°.

7. The process of claim 1 wherein hydrogen-containing gas is introduced into the catalyst-oil mixture at the bottom of the reactor to prevent coking in said mixture below said separating screen.

8. The process of claim 7 wherein 10 to 4000 normal cubic meters of hydrogen-containing gas per ton of total oil feed is introduced into said catalyst-oil mixture.

9. The process of claim 1, wherein cold oil is introduced into the catalyst-oil mixture at the bottom of the reactor to prevent coking in said mixture below said separating screen.

10. The process of claim 9 wherein the amount of cold oil introduced into the bottom of the reactor is at most 10% by weight of the total oil feed, and wherein the temperature of said cold oil feed is between ambient and 350° C.

References Cited
UNITED STATES PATENTS

| | | | |
|---|---|---|---|
| 2,616,678 | 11/1952 | Grossman | 208—165 |
| 2,739,877 | 3/1956 | Quigg et al. | 208—166 |
| 3,079,329 | 2/1963 | Browning | 208—157 |
| 3,410,791 | 11/1968 | Perry et al. | 208—157 |
| 3,005,772 | 10/1961 | Bergstrom et al. | 208—173 |

HERBERT LEVINE, Primary Examiner

U.S. Cl. X.R.

23—288 G, 165, 166, 213